UNITED STATES PATENT OFFICE.

ERICH RIETZ, OF ELBERFELD, GERMANY, ASSIGNOR TO SYNTHETIC PATENTS CO. INC., OF NEW YORK, N. Y., A CORPORATION OF NEW YORK.

CHOLIC-ACID FORMALDEHYDE CONDENSATION PRODUCT.

1,213,261.  Specification of Letters Patent.  Patented Jan. 23, 1917.

No Drawing.  Application filed December 29, 1914.  Serial No. 879,516.

*To all whom it may concern:*

Be it known that I, ERICH RIETZ, doctor of philosophy, chemist, citizen of the German Empire, residing at Elberfeld, Germany, have invented new and useful Improvements in Cholic-Acid Formaldehyde Condensation Products, of which the following is a specification.

I have found that new and therapeutically valuable preparations can be obtained by treating cholic acid ($C_{24}H_{40}O_5$) with an active methylene-containing substance such as formaldehyde or its polymers.

The new preparations are whitish powders soluble in alcohol and glacial acetic acid. They have proved to be valuable remedies characterized by their property of disinfecting the bile by splitting off formic aldehyde in it.

According to the duration of the reaction products are obtained which are either soluble in alkali or insoluble in it. They form salts with metals. At first the alkali insoluble condensation products result which are converted into the alkali soluble products by a further action of the formic aldehyde. The products insoluble in alkali are tasteless. My new products are chemically most probably products of condensation of the formic aldehyde with the cholic acid with separation of one or several molecules of water.

In order to illustrate the new process more fully the following examples are given, the parts being by weight:

Example 1: The alkali insoluble compound can be obtained as follows:—40 parts of cholic acid are intimately mixed with 6 parts of paraformaldehyde and the mixture is heated in an open vessel to 160–170° C. during half an hour. In order to remove unchanged cholic acid the mass of the reaction is extracted with a dilute soda solution, it is dissolved in alcohol, the solution is filtered and is introduced into 2000 parts of ice water. The resulting product is after being dried and pulverized a whitish tasteless powder, melting at about 170° C., soluble in alcohol and glacial acetic acid and soluble with difficulty in benzene.

Example 2: The alkali soluble product can be obtained by mixing 100 parts of cholic acid with 50 parts of paraformaldehyde. The resulting mixture is then heated to 170–190° C. in an open vessel during two hours. After cooling the mass of the reaction is dissolved in alcohol, the solution is filtered and introduced into 2000 parts of ice-water. The precipitate is a whitish powder melting at about 140° C. It is soluble in alcohol and glacial acetic acid. Barium chlorid precipitates from its solution in dilute ammonia the barium salt as a white powder.

I claim:—

1. The herein described new and therapeutically valuable substances being chemically condensation products of cholic acid and an active methylene-containing substance, said substances being soluble in alcohol, substantially as described.

2. The herein described new and therapeutically valuable products being chemically compounds of cholic acid and formic aldehyde which are whitish powders soluble in alcohol and glacial acetic acid, substantially as described.

3. The herein described new and therapeutically valuable product being chemically a compound of cholic acid and formic aldehyde which is a whitish powder soluble in alkali, alcohol and glacial acetic acid, melting at about 140° C., substantially as described.

In testimony whereof I have hereunto set my hand in the presence of two subscribing witnesses.

ERICH RIETZ. [L. S.]

Witnesses:
HELEN NUFER,
ALBERT NUFER.